United States Patent
Matsushita et al.

[11] Patent Number: 5,982,055
[45] Date of Patent: Nov. 9, 1999

[54] MINIATURE MOTOR

[75] Inventors: Ikuo Matsushita; Fumiyoshi Itou; Megumu Onishi, all of Matsudo, Japan

[73] Assignee: Mabuchi Motor Co., Ltd., Matsudo, Japan

[21] Appl. No.: 09/035,322

[22] Filed: Mar. 5, 1998

[30] Foreign Application Priority Data

Mar. 6, 1997 [JP] Japan .................................. 9-051216

[51] Int. Cl.$^6$ .................................................. H02K 5/24
[52] U.S. Cl. .................................. 310/40 MM; 310/269; 310/261; 310/264; 310/216; 310/193
[58] Field of Search ........................... 310/40 MM, 269, 310/261, 264, 216, 193

[56] References Cited

U.S. PATENT DOCUMENTS

| | | | |
|---|---|---|---|
| 3,617,785 | 11/1971 | Kristiansen | 310/236 |
| 3,777,367 | 12/1973 | Kalagidis | 29/597 |
| 3,864,821 | 2/1975 | Ito et al. | 29/597 |
| 4,197,477 | 4/1980 | Reynolds | 310/264 |
| 4,583,015 | 4/1986 | Toshimitsu | 310/187 |
| 4,616,151 | 10/1986 | Pryijmak | 310/216 |
| 5,327,035 | 7/1994 | Sunaga | 310/81 |

*Primary Examiner*—Nestor Ramirez
*Assistant Examiner*—Saeed Ghahramani
*Attorney, Agent, or Firm*—McGlew and Tuttle, P.C.

[57] ABSTRACT

A miniature motor with a two-pole stator, and a rotor having three or more salient poles each having a core with flanges extending toward both sides thereof and a winding. The rotor is adapted to simulate a two-pole construction by cutting off at least the tip of a flange on either side on a part or all the salient rotor pole cores, thereby limiting the spontaneous-stop angular positions of the rotor to two. One insulating spacer is provided between a plurality of commutator segments of the commutator in such a positional relationship as to come in contact with one of the two brushes when the rotor is at a spontaneous-stop angular position. The motor is prevented from burning and restarting suddenly after a stop since the motor has a self-inactivating function by interrupting current supply at spontaneous-stop angular positions while maintaining motor torque by minimizing the angle of non-conduction to the rotor.

12 Claims, 9 Drawing Sheets

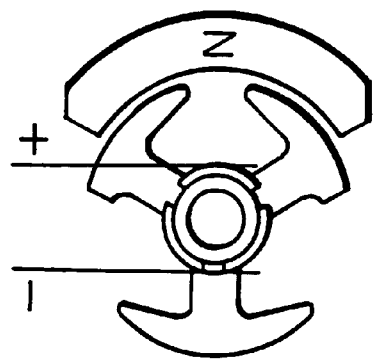
FIG. 6 (c) 360°
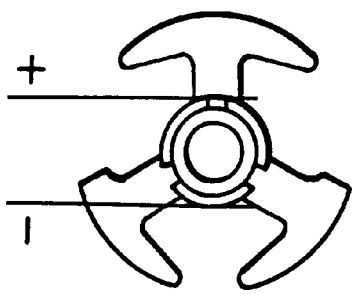
FIG. 6 (b) 180°
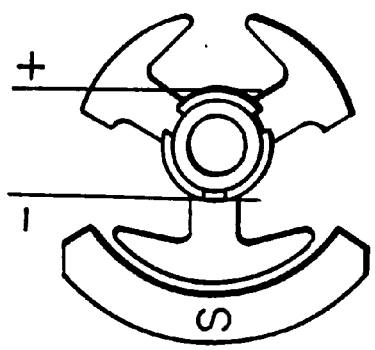
FIG. 6 (a) 0°

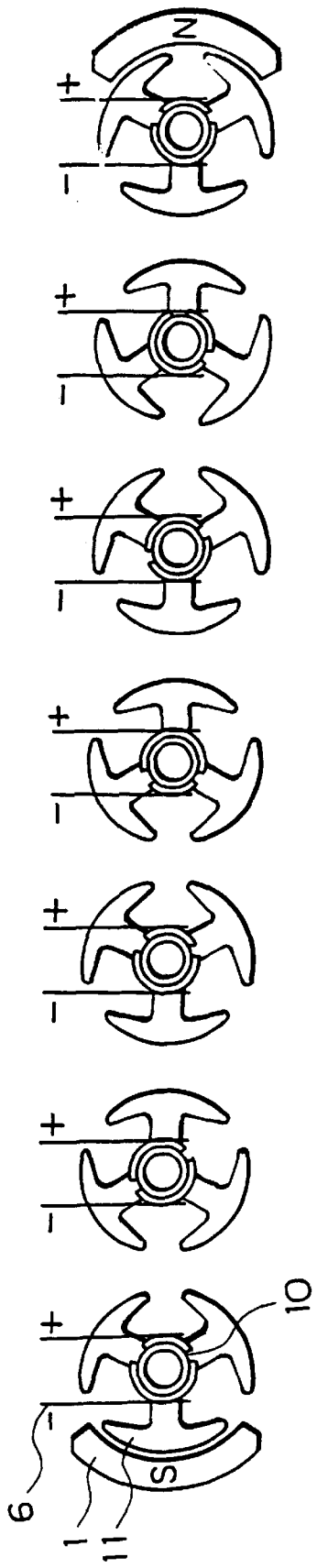

MINIATURE MOTOR

FIELD OF THE INVENTION

This invention relates to a miniature motor using a rotor with three or more salient poles and a commutator with three or more grooves and having anti-burning and self-inactivating functions.

BACKGROUND OF THE INVENTION

Conventional miniature motors using a rotor with three or more salient poles and a commutator with three or more grooves have no self inactivating function. For this reason, when excess load is applied to the motor or rotation is forcibly discontinued, the motor tends to burn out due to overheating because excess current is kept flowing, or even if stopped temporarily, the motor happens to restart suddenly immediately after the load is removed. As a result, the miniature motor, when applied to a model airplane, for example, tends to burn out if the model airplane falls to the ground, or the plane tends to run out of control due to the sudden restart of the motor. Furthermore, an electric fan to which the miniature motor having no self inactivating function is incorporated is very dangerous if a child happens to put his finger into the fan guard.

To equip a miniature motor with a self-inactivating function, the motor should be of such a construction that current supply be interrupted when the rotor of the motor is at a spontaneous-stop angular position. With a miniature motor having two salient rotor poles, where it is relatively easy to limit the spontaneous-stop angular position, current supply can be easily interrupted at the limited stop position.

The term "self-inactivating function" used herein means a function to prevent current from flowing in the motor which is forcibly stopped operation while the power is on by means of a specially designed insulating spacer on the commutator. The motor having the self-inactivating function requires an external force (by hand, for example) to be started again.

The term "spontaneous stop" used herein means that after the power is turned off, the motor keeps running for a while due to inertial force and eventually comes to a halt.

FIG. 11 shows a rotor of a conventional type of miniature motor using a two salient rotor poles. FIG. 12 is a cross-sectional view taken substantially along line XXII—XXII in FIG. 11. In these figures, numeral 7 refers to a rotor shaft, 8 to a salient rotor pole core, 10 to a commutator, 11 to a flange of the pole core 8, and 16 to a pole winding, respectively. Since this miniature motor has a two-pole stator (not shown) consisting of two magnets, the angular positions at which the motor stops spontaneously due to the influence of cogging are only two positions; namely, an angular position at which one salient rotor pole faces the N pole of the stator while the other salient rotor pole faces the S pole, and an angular position, rotated 180 degrees from the aforementioned angular position, at which one salient rotor pole faces the S pole of the stator while the other salient rotor pole faces the N pole. Conventional miniature motors having a self-inactivating function have such a construction that current supply is interrupted when the rotor is at any of the spontaneous-stop angular positions.

FIG. 13 is an exploded perspective view of a commutator in the rotor of the conventional construction shown in FIG. 11. Two commutator segments 12 are provided on the outer peripheral surface of a commutator cylinder 14 made of an insulating resin, with two insulating spacers 15, which are integrally formed with the commutator cylinder 14, provided between the two commutator segments 12 to separate and insulate the commutator segments. Numeral 13 refers to a commutator support ring. Two brushes are disposed in such a positional relationship that the brushes are each on the two insulating spacers 15 when the motor rotor is at any of the spontaneous-stop angular positions. With this arrangement, the self-inactivating function of a miniature motor having a two-pole rotor can be accomplished as current supply is interrupted at any of the positions where the rotor is stopped, and no sudden restart is caused.

To obtain a larger torque without increasing the size of the motor, the motor is required to have three or more salient rotor poles. It has been practically impossible to achieve a self-inactivating function with the conventional motors having three or more rotor poles. Since the motor commutator is originally used to feed current to rotor windings, it is not desirable to increase the torque of the motor by providing a large number of insulating spacers on the commutator surface to increase the non-conduction angle at which no current is supplied to the rotor. Motors with three or more rotor poles, on the other hand, involve multiple spontaneous-stop angular positions. In a three-pole motor, for example, in which the motor stops at positions of 360°/6, it is practically impossible to interrupt current supply at all the stop positions to maintain motor torque.

FIG. 14 is a diagram of assistance in explaining stop positions in a conventional type of miniature motor having a three-pole rotor. At position (a) of the spontaneous-stop angle of 0° at the left of FIG. 14, a first salient rotor pole core faces the S pole of the stator. This represents a spontaneous-stop angular position. At a position (b), rotated 60° from the original position, a second salient rotor pole faces the N pole of the stator, where the motor stops spontaneously. At a position (c), further rotated 60° from the original position, a third salient rotor pole faces the S pole of the stator where the motor stops spontaneously. Similarly, there are spontaneous-stop angular positions at every turn by 60°. Since the 360° position (g) is the same as the 0° position, there are a total of six spontaneous-stop angular positions. To achieve the self-inactivating function, insulating spacers must be inserted in all the three gaps between the three commutator segments to interrupt current supply at all the six spontaneous-stop angular positions. As described above, however, it is practically impossible to achieve this in terms of motor torque. Even when only one insulating spacer is inserted to interrupt current supply at the spontaneous-stop angular position (a) of 00 to prevent the motor from restarting suddenly, current supply cannot be interrupted at the next position (b), rotated 60°, or at the position (c), etc. The terms "Can be started" and "Cannot be started" in FIG. 14 mean this state.

SUMMARY AND OBJECTS OF THE INVENTION

It is a primary object of this invention to prevent a miniature motor using a rotor with three or more salient poles from being burnt out or restarted suddenly after a stop by providing the motor with a self-inactivating function by interrupting current supply at any of rotor spontaneous-stop angular positions while maintaining motor torque by minimizing the non-conduction angle at which no current is supplied to the motor rotor.

The miniature motor according to this invention has such a construction that the core of the rotor having three or more salient poles as a whole acts as an apparent two-pole construction by cutting at least a tip of a flange on one side for a part or all of the rotor core to limit the number of rotor spontaneous-stop angular positions to two, and only one insulating spacer is provided between a plurality of commutator segments in such a manner that the insulating spacer is disposed so as to come in contact with any one of the two brushes when the rotor is at a spontaneous-stop angular position.

This invention provides a motor having a rotor with three or more salient poles in an apparent two-pole construction to achieve the effect of "high torque and high motor efficiency" intrinsic to motors having three or more rotor poles by limiting the number of spontaneous-stop angular positions of the rotor to two and providing only one insulating spacer between commutator segments to interrupt current supply at any of the spontaneous-stop angular positions of the rotor while maintaining motor torque by minimizing non-conduction angles at which no current is supplied to the motor rotor. With this arrangement, current can be positively interrupted when excess load is applied to the motor, causing motor rotation to forcibly stop. Since the motor, once stopped in this manner, can be prevented from being suddenly restarted, or from running out of control, and can be restarted merely by giving an inertial force externally, the motor requires no switches. This is effective in lightweighting the motor, simplifying circuits, and achieving economy. Furthermore, this type of motor having a self-inactivating function is safe when applied to model airplanes, electric fans, etc.

The miniature motor of this invention has three salient rotor poles, with one pole core having bilaterally symmetrical flanges, and the remaining two pole cores having two flanges, one of which on the side of the pole core having the bilaterally symmetrical flanges has been cut off at least at the tip thereof. With this construction, the number of spontaneous-stop angular positions of the rotor are limited to two, as with the motor having a two-pole rotor, and current is not allowed to flow at these limited spontaneous-stop positions.

The miniature motor of this invention has large cogging because at least the tip of the aforementioned flange on the side of the pole core having bilaterally symmetrical flanges is cut off with a predetermined angle left between the cutting direction and the radial direction from the central axis so that as much core area as possible can be left.

The windings of the miniature motor of this invention are prevented from coming out of the core even when a large portion of the core tip is cut off to ensure large cogging because the outermost laminate sheets on both sides of the laminated pole core in the laminating direction are left uncut.

The miniature motor of this invention has four salient rotor poles, with at least the tips of the flanges of all the four poles being cut off alternately on the right or left side. This miniature motor having four salient rotor poles can also interrupt current supply at any of the stop positions with only one insulating spacer.

The miniature motor of this invention is capable of adjusting non-conduction angle at which no current is supplied to the rotor by adjusting the width or height of the insulating spacer. With this, the force required for restart can be adjusted.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a diagram of assistance in explaining the stop positions of a miniature motor using three salient rotor poles having a core configuration according to this invention;

FIG. 14 is a diagram of assistance in explaining the stop positions of a conventional type miniature motor having a three-pole rotor.

DESCRIPTION OF THE PREFERRED EMBODIMENT

Figure 1:
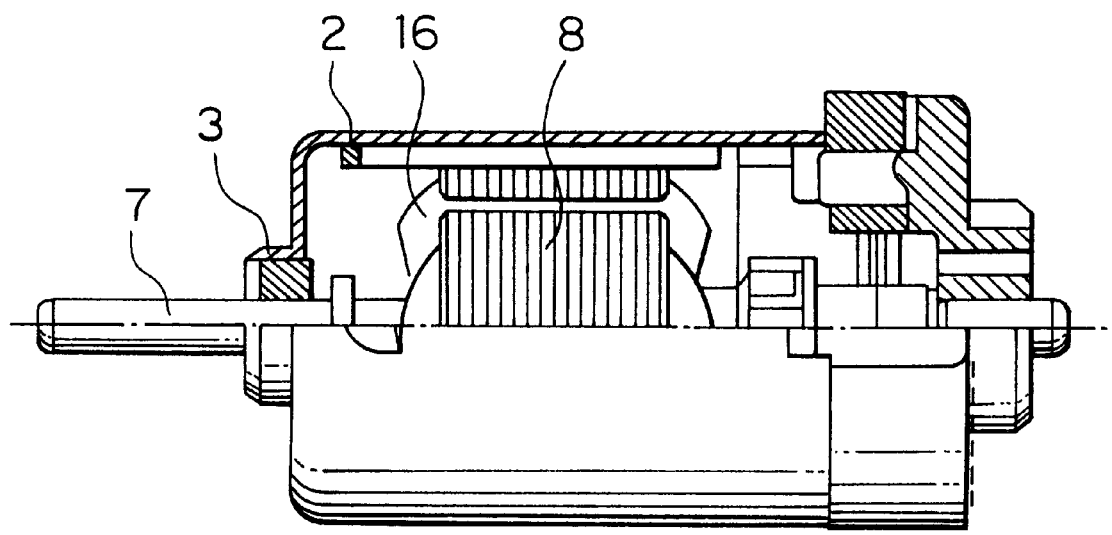
FIG. 1 is a diagram illustrating the overall construction of a miniature motor embodying this invention, with the upper half shown in cross section.
Figure 2:
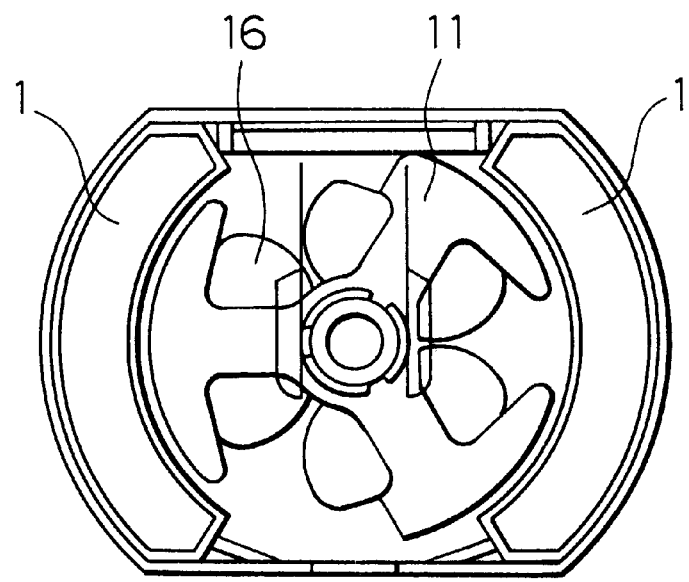
FIG. 2 is an axial cross-section of the commutator and magnetic pole core of the miniature motor shown in FIG. 1.
Figure 3:
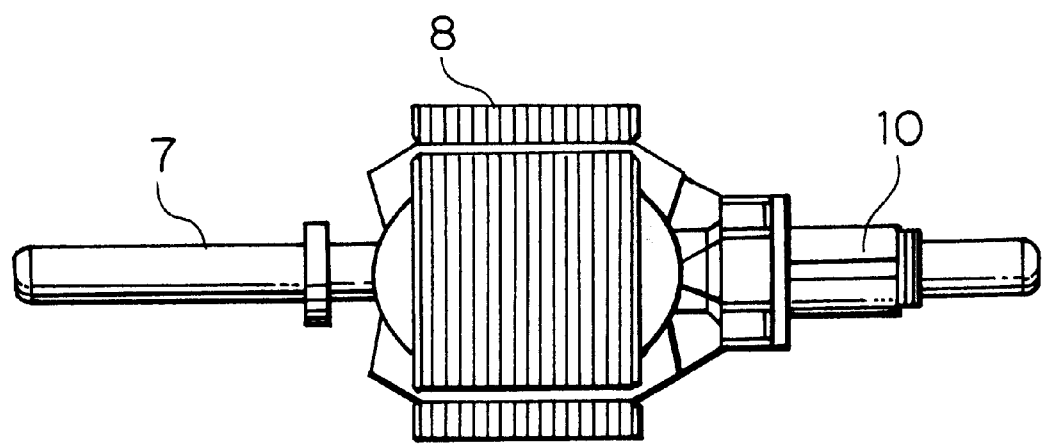
FIG. 3 is a plan view of the rotor of the miniature motor shown in FIG. 1.
Figure 4:
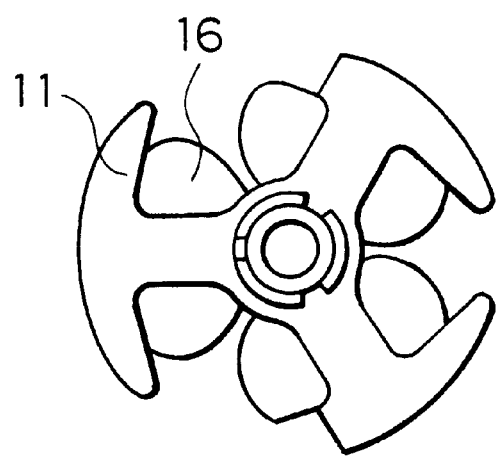
FIG. 4 is an axial cross-section of the commutator and poles of the rotor shown in FIG. 3.

A miniature motor having three salient rotor poles embodying this invention will be described in the following and referring to the drawings. FIG. 1 is a diagram illustrating the overall construction of a miniature motor embodying this invention, with the upper half shown in cross section. FIG. 2 is an axial cross-section of the commutator and pole core of the miniature motor shown in FIG. 1. FIG. 3 is a diagram showing the rotor alone of the miniature motor of FIG. 1. FIG. 4 is an axial cross-section of the commutator and poles of the rotor shown in FIG. 3. In the figures, numeral 1 refers to magnets constituting two-pole stator poles, 2 to a housing, 3 to a bearing, 7 to a shaft, 8 to a core constituting a salient rotor pole, 10 to a commutator, 11 to a core flange of the salient rotor pole, and 16 to a winding of the salient rotor pole, respectively.

The stator of the miniature motor shown in the figures is of a two-pole construction formed by magnets, while the rotor thereof is of a salient three-pole construction having windings. This miniature motor, which rotates normally by feeding current through the commutator, is characterized by the construction of the core flange 11 of the salient rotor pole, which will be described later, and the construction of the commutator. That is, whereas the rotor of this miniature motor is actually of a salient three-pole type, the core has such a construction as to apparently form a two-pole configuration as a whole by cutting off at least a tip of the flange 11 on one side for two of the three salient rotor poles. With this arrangement, the number of spontaneous-stop angular positions are limited to two, as with the aforementioned motor having a two-pole rotor, and current flow is adapted to be interrupted at these limited rotor stop positions.

Figure 5:
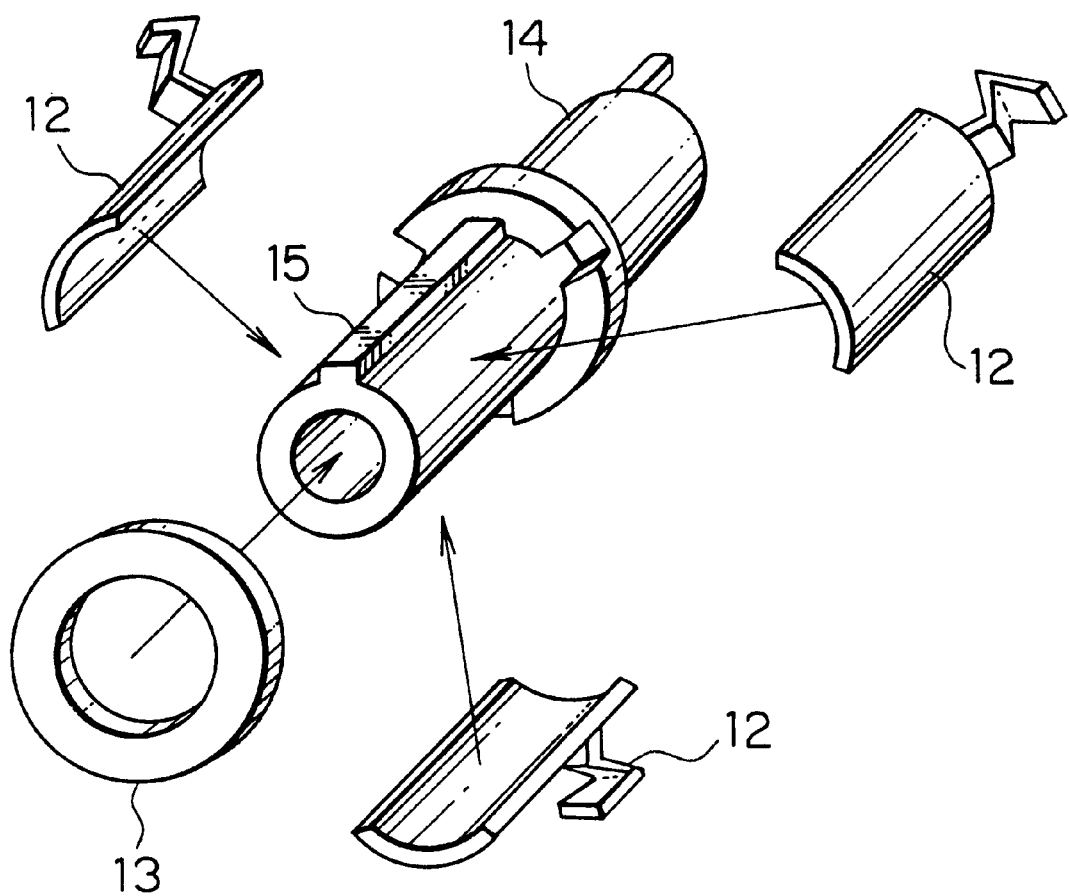
FIG. 5 is an exploded perspective view of a commutator for a miniature motor having three salient rotor poles.

FIG. 5 is an exploded perspective view of the commutator for the salient three-pole rotor. In FIG. 5, numeral 12 refers to three commutator segments each having the same construction, 13 to a commutator support ring, 14 to a commutator cylinder, 15 to an insulating spacer, respectively. The insulating spacer 15, the only one of which is provided for the commutator, has a predetermined width in the circumferential direction, and can be formed integrally with the commutator cylinder made of an insulating resin. Though the detailed operation will be described later, any one of the two brushes is adapted to be in such a positional relationship as to come in contact with the insulating spacer 15 at any of the rotor spontaneous-stop positions. Current is therefore interrupted at the rotor spontaneous-stop positions. Although the miniature motor of this invention has an insulating spacer for interrupting current supply on the outer peripheral surface of the commutator, motor rotation can be maintained by inertial force during motor rotation under the rated load even when the brush happens to ride over the insulating spacer. If the brush falls to ride over the insulating spacer due to the decreased inertial force resulting from a drop in motor rotation under an overload condition, current supply to the motor is interrupted, causing the motor to stop. The motor remains stopped until restarted by applying an external force.

Figure 11:
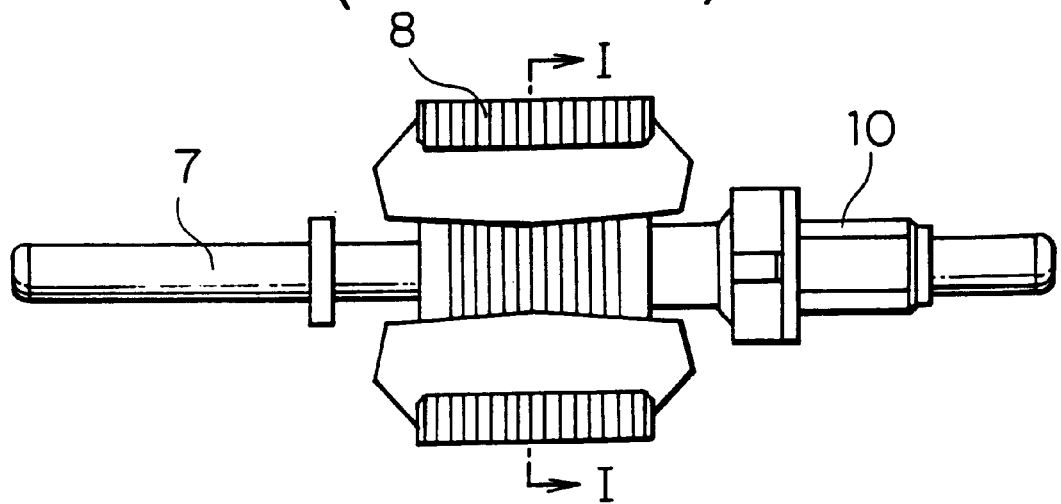
FIG. 11 is a diagram of the rotor of a conventional type of miniature motor using two salient rotor poles.
Figure 12:
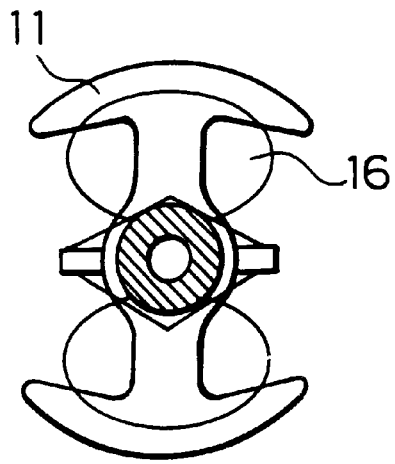
FIG. 12 is a cross-section taken substantially taken along line XII—XII in FIG. 11.
Figure 13:
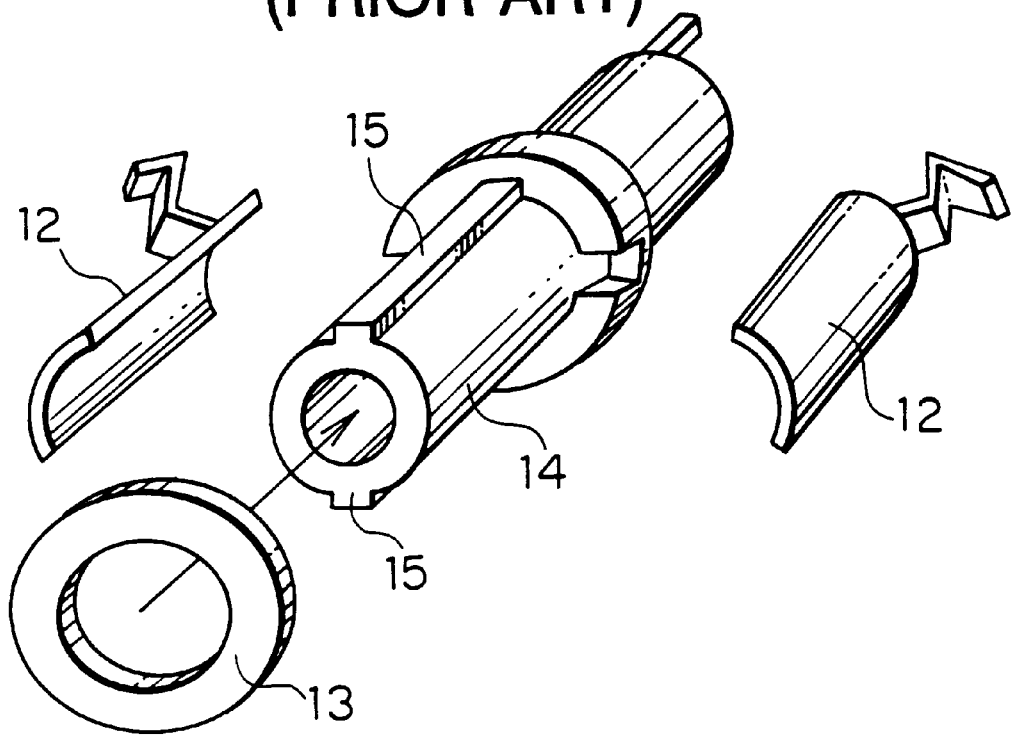
FIG. 13 is an exploded, enlarged perspective view of the commutator of the conventional type of rotor shown in FIG. 11.

FIG. 6 is a diagram of assistance in explaining spontaneous-stop positions in a miniature motor using a salient three-pole rotor having a core construction according to this invention. One of the three salient rotor poles of this invention has bilaterally symmetrical core flanges, as in the prior-art poles described earlier, referring to FIGS. 11 and 12, while each of the remaining two poles has a flange on the side of the bilaterally symmetrical pole which has been cut off at least the tip thereof With this arrangement, the pole cores having flanges with cut-off tips are bilaterally asymmetrical, but the salient rotor poles as a whole is bilaterally symmetrical with respect to a line passing through the center of the bilaterally symmetrical pole, and apparently forms a two-pole construction, with the bilaterally symmetrical pole as one pole and the remaining two poles with cut-off flange tips collectively as the other pole.

This type of miniature motor stops due to the effect of cogging at the spontaneous-stop position (a) of 0° as shown at the left of FIG. 6. In this state, the bilaterally symmetrical pole of the three salient rotor poles faces the S pole of the stator, while the remaining two salient rotor poles collectively face the N pole of the stator. At this spontaneous-stop position (a), the positive-side brush comes in contact with a commutator segment, as shown in the figure, whereas the other negative-side brush rests on the insulating spacer integrally formed with the commutator cylinder. In this state, the current path from the positive-side brush to the negative-side brush via the commutator segments and the windings is cut off, preventing the current from flowing in the path. Thus, the motor is prevented from starting suddenly. The motor that remains stopped can be restarted by applying an inertial force externally (by hand, for example).

The motor stops next at the spontaneous-stop position (b) of 180° where the bilaterally symmetrical pole faces the other N pole of the stator, and the remaining two salient rotor poles face the S pole of the stator. At this stop position (b), the positive-side brush rests on the insulating spacer, preventing current from flowing, and thereby preventing the motor from starting suddenly. The motor stops next at the spontaneous-stop position (c) of 360° which is the same as the stop position of 0°. Thus, the motor stops only at the stop positions of 0° and 180° where either of the brushes comes in contact with the insulating spacer, preventing current from flowing.

Figure 7A:
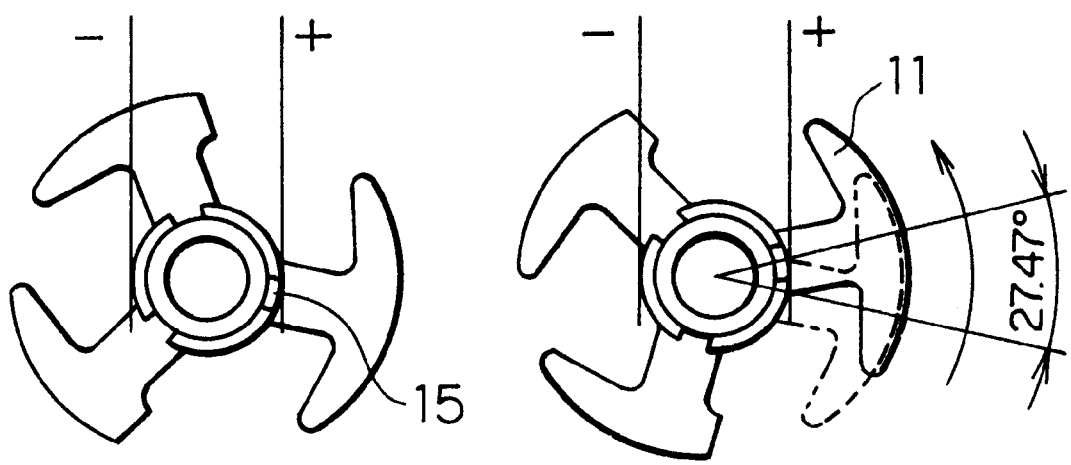
FIG. 7 is a diagram of assistance in explaining how the force required for restart can be adjusted by adjusting the width or height of the insulating spacer.
Figure 7B:
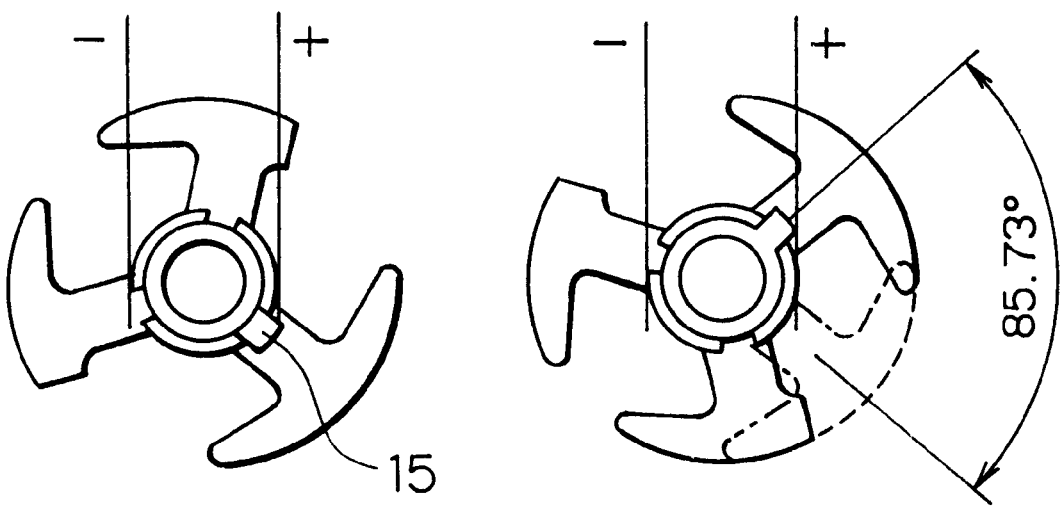

FIG. 7 is a diagram of assistance in explaining that the force required for restart can be adjusted by changing the width or height of the insulating spacer. The angle at which the brush comes in contact with the insulating spacer, preventing current from flowing can be adjusted by changing the circumferential width of the insulating spacer. To prevent the motor from starting suddenly, it is necessary to increase the external force required for restart. But too large the non-conduction angle would shorten the conduction time at which current is supplied to the rotor, leading to decreased torque. The force required for restart must therefore be adjusted appropriately in accordance with specific applications of the miniature motor.

FIG. 7 shows the state where the positive-side brush comes in contact with the insulating spacer 15; the upper two figures of FIG. 7 showing the surface of the insulating spacer made flush with the outer peripheral surface of the commutator, and the lower two showing the surface of the insulating spacer raised from the outer peripheral surface of the commutator. FIG. 7 shows that the non-conduction angle can be adjusted not only by changing the width of the insulating spacer but also by changing the height thereof In either of the upper and lower figures of FIG. 7, as the rotor rotates counterclockwise, the positive-side brush begins coming in contact with the insulating spacer at the rotor position shown at the left of the figure, breaking the contact with the commutator. The figure also shows that this state is kept until the rotor rotates to the angular position shown at the right of the figure. FIG. 7 also shows an example that the non-conduction angle of the rotor set at 27.47° by changing the width of the insulating spacer can be set to 85.73° by changing the height of the insulating spacer without changing the width thereof.

Figure 8:
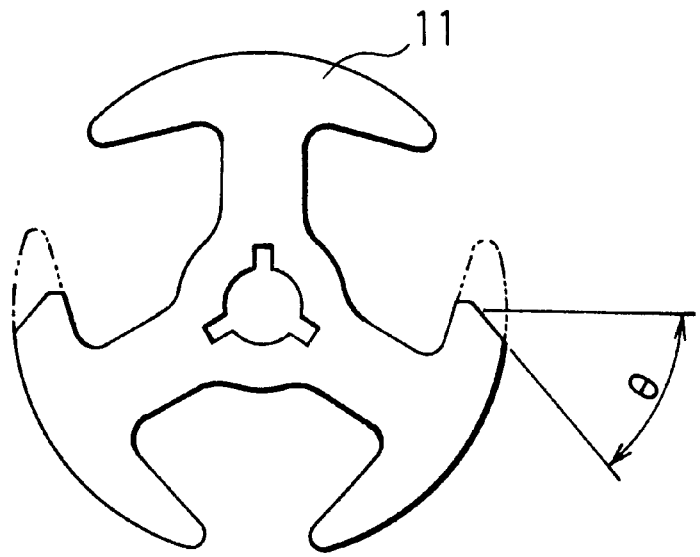
FIG. 8 is a diagram illustrating another example of how to cut off the tip of a salient rotor pole core flange.

FIG. 8 shows another example of the core flange of the salient rotor pole the tip of which was cut off. As shown in the figure, the tip of the core flange was cut off at a predetermined angle θ (preferably, 48°–88°) in the radial direction (that is, in the outward direction from the center axis). By doing this, large cogging can be obtained while leaving as much core as possible uncut.

Figure 9:
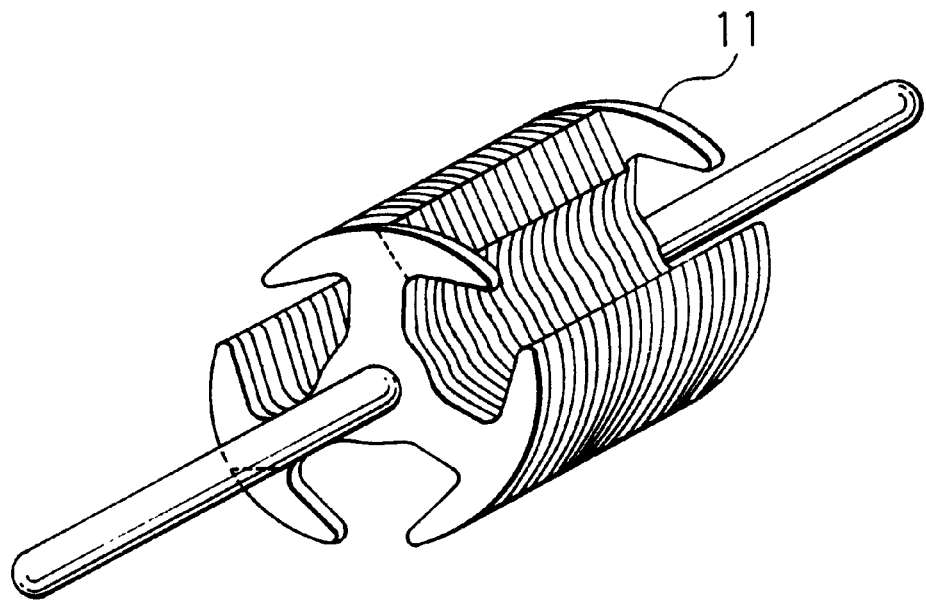
FIG. 9 is a diagram illustrating still another example of how to cut off the tip of a salient rotor pole core flange.

FIG. 9 shows still another example of the salient rotor pole, the tip of which was cut off. In the example, the tip of the core flange was cut off, with the outermost laminate sheets on both sides left uncut. By doing this, the windings are prevented from coming out of the core even when the tip of the core is cut off to a large extent to ensure large cogging.

Figure 10:
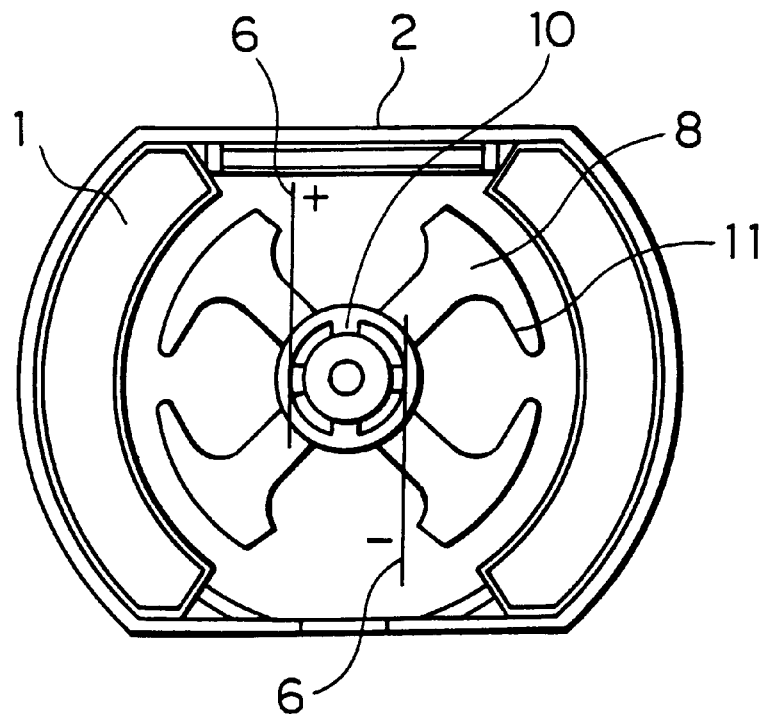
FIG. 10 is a diagram of a miniature motor embodying this invention, having four salient rotor poles.

FIG. 10 shows a miniature motor of this invention having four salient rotor poles. The salient rotor pole core of this motor is such that at least the tip of one of the two flanges extending toward both sides of the core was cut off alternately in such a manner that the uncut flanges of the adjoining poles face each other, with the cut-off flanges of the adjoining poles facing each other, so that the pole core forms a two-pole configuration. With this miniature motor having four salient rotor poles, where there are only two spontaneous-stop positions; that is, the position shown in the figure, and a position turned 180° from that position, current can be interrupted at any stop position with one insulating spacer, and the windings can be easily wound because the tips of the flanges were cut off.

While specific embodiments of the invention have been shown and described in detail to illustrate the application of the principles of the invention, it will be understood that the invention may be embodied otherwise without departing from such principles.

What is claimed is:

1. A miniature motor comprising:

a stator with two magnet poles;

a rotor arranged in said stator;

a first core on said rotor and forming salient pole core, said first core having two bilaterally symmetrical flanges forming a first apparent pole;

second and third cores on said rotor and each forming a salient pole core, said second and third cores each having two flanges, said flanges of said second and third cores adjacent said first core being cut-off flanges to cause a combination of said second and third cores to form another apparent pole;

first and second brushes on said stator;

a commutator with a plurality of commutator segments on said rotor, said commutator including only one insulating spacer positioned between two of said commutator segments, a size and position of said insulating spacer blocking contact of one of said brushes with any of said commutator segments when one of said apparent poles are facing one of said magnet poles.

2. A miniature motor as set forth in claim 1, wherein:

said cut-off flanges are cut at a predetermined angle between a direction in which said flange is cut and a radial direction of said rotor.

3. A miniature motor as set forth in claim 1, wherein;

said three salient pole cores are formed by a plurality of laminate sheets and said cut-off flange is cut, with outermost said laminate sheets on both sides of said cores left uncut.

4. A miniature motor as set forth in claim 1, wherein:

one of a circumferential width and radial height of said insulating spacer from adjacent said commutator segments determine a non-conduction angle for breaking electrical contact of one of said brushes with said commutator.

5. A miniature motor comprising:

a stator with two magnet poles;

a rotor arranged in said stator;

first and second cores on said rotor and each forming a salient pole core, said first and second cores each having two flanges, said flanges of said first and second cores which are facing circumferentially outward being cut-off flanges to cause a combination of said first and second cores to form an apparent pole;

third and fourth cores on said rotor and each forming a salient pole core, said third and fourth cores each having two flanges, said flanges of said third and fourth cores which are adjacent said apparent pole being cut-off flanges to cause a combination of said third and fourth cores to form another apparent pole;

first and second brushes on said stator;

a commutator with a plurality of commutator segments on said rotor, said commutator including only one insulating spacer positioned between two of said commutator segments, a size and position of said insulating spacer blocking contact of one of said brushes with any of said commutator segments when one of said apparent poles is facing one of said magnet poles.

6. A miniature motor comprising:

a stator with first and second magnet poles;

a rotor rotatably mounted in said stator;

a plurality of rotor poles on said rotor, each of said rotor poles including a core and flanges, flanges of two of said rotor poles cooperating to form an apparent rotor pole;

first and second brushes on said stator;

a commutator with a plurality of commutator segments on said rotor, said commutator including an insulating spacer positioned between two of said commutator segments, a size and position of said insulating spacer blocking contact of one of said brushes with any of said commutator segments when said apparent pole is facing one of said magnet poles.

7. The motor in accordance with claim 6, wherein:

flanges of one of said plurality of rotor poles are substantially symmetrically arranged about a respective said core of said one rotor pole to form another apparent rotor pole;

said size and position of said insulating spacer blocks contact of one of said brushes with any of said commutator segments when either one of said apparent poles is facing one of said magnet poles.

8. The motor in accordance with claim 7, wherein:

a combined size of said flanges of each of said two rotor poles are unequal to a combined size of said flanges of said one rotor pole.

9. The motor in accordance with claim 7, wherein:

a spacing between adjacent said flanges of said two rotor poles is less than a spacing between one said flange of said one rotor pole and an adjacent flange of said two rotor poles.

10. The motor in accordance with claim 6, wherein:

flanges of another two of said rotor poles cooperate to form another apparent rotor pole;

said size and position of said insulating spacer blocks contact of one of said brushes with any of said commutator segments when either one of said apparent poles is facing one of said magnet poles.

11. The motor in accordance with claim 10, wherein:

a spacing between adjacent said flanges of said apparent poles is less than a spacing between a flange of said apparent pole and an adjacent flange of said another apparent pole.

12. The motor in accordance with claim 6, wherein:

said apparent pole forms a spontaneous-stop position with each of said magnet poles of said stator;

said insulating spacer stops current flow to said rotor when said apparent pole is in one of said spontaneous-stop positions.

* * * * *